Patented June 16, 1931

1,810,661

UNITED STATES PATENT OFFICE

WOLF KRITCHEVSKY, OF CHICAGO, ILLINOIS

COMBINED DYE AND STRIPPER

No Drawing.   Application filed October 23, 1929. Serial No. 401,982.

My invention consists in a mixture of chemicals having the function of removing color and affixing a color in the same operation.

There are on the market many dye combinations, that is, dyes combined with carriers or assistants such as soap, mordants, etc. There are also numerous strippers or color removers to be had, but there has been, so far as known, no attempt made to physically combine or intermix a stripper and a dye for household use. Such a compound has numerous advantages, one of the important of which is that of convenience and simplicity of operation. For example, one having a dark colored garment and wishing to dye it a different and lighter color, would, under the known practice, place the garment in a vessel with a solution of the stripping agent, boil it until the original color was removed, and then remove and rinse the garment thoroughly and then repeat the operation in a dye solution of the desired color. This operation requires considerable time, a number of different vessels and some degree of skill for good results.

By utilizing the product and following the process outlined herein, the complete operation of removing old color and applying a new color is performed simultaneously in a single vessel and in the same time that was required for one of the operations in the old process.

The majority of the dyes commonly used are decolorized by stripping compounds that release hydrogen, such as zinc dust and an acid reacting substance, or a hydro-sulphite salt, or a sulphoxylate salt with or without acid reacting substances.

There are other less common dyes that are affected by such stripping agents only to the extent that they are rendered colorless only so long as they are in the presence of the reducing agent, and that on exposure to the air take on an atom of oxygen and are restored to their original color.

The invention consists, therefore, in combining and marketing for use in combined form, a stripper and a dye or a mixture of dyes that is not destroyed by the action of the stripper, but which are temporarily decolorized while in the solution. This will constitute the subject of this application.

There are other dyes that are not affected in any way by the stripping agents commonly used and which may be combined therewith for simultaneous use. The specific combination of these substances is covered in a copending application.

An example of a compound that will operate as specified is as follows: 2 ounces of a red dye such as safranine color index No. 841, and 2 ounces of a stripping agent such as sodium hydrosulphite dissolved in water. The solution becomes practically colorless as the safranine is reduced to its leuco base but the dye is not otherwise changed. A piece of fabric that may have been dyed black, for example, is then immersed in the solution for a period of from ten to fifteen minutes. The black dye that previously adhered to the fabric will be destroyed and the fabric will become practically colorless. However, it will be impregnated with the leuco base of the safranine red and upon removal of the fabric and upon exposure to the air, the leuco base will be oxidized and the color will appear, the fabric becoming red instead of black.

Numerous other dyes of different colors may be substituted or used instead of the safranine red. For example, malachite green, color index No. 657 or methylene blue B—B color index No. 922 may be used in proportions dependent on the depth of the color desired.

Instead of sodium hydrosulphite as a reducing agent, other chemicals may be used, such as zinc dust and sodium bisulphite, or basic zinc sulphoxylate and sodium bisulphite, or sodium sulphoxylate and an acid reacting substance, and any other similar reducing agents, like stannous chloride, $SO_2$ etc.

The compound may be manufactured and sold in powdered form, in a solution of water, alcohol or other solvents, or in any intermediate solid or semi-solid form. If desired, other chemicals may be added as diluents, like salt, starch or sugar, or mordants such as chromium salts, or dye assistants, such as substituted naphthaline sulphonic acid salts, commercially known as "Nekal."

The method of oxidizing the leuco base by exposure to the air is the simplest manner of accomplishing the result. Oxidizing however, may be accomplished in other manners.

Mixtures of dyes may also be used with like effect.

I claim:

1. A composition of matter in solid form adapted to be dispensed in packages and to be combined with a liquid for simultaneous dyeing and stripping consisting of chemicals that will evolve hydrogen in the presence of water, and strip color from fabrics, and water soluble dyes that will be reduced to leuco bases by the stripping chemicals and that will attach themselves to fabrics and oxidize to the original color on exposure of the fabric to the air.

2. A composition of matter in solid form adapted to be dispensed in packages and to be combined with a liquid for simultaneous dyeing and stripping consisting of chemicals that will evolve hydrogen in the presence of water and strip color from fabrics, and water soluble dyes that will be reduced to leuco bases by the stripping chemicals and remain in the solution as a colorless element thereof, said leuco bases being adapted to adhere to a fabric in the solution and to oxidize to its original color on exposure of the fabric to an oxidizing agent.

In testimony whereof I have affixed my signature.

WOLF KRITCHEVSKY.